United States Patent
Ratekin et al.

(10) Patent No.: US 12,496,511 B2
(45) Date of Patent: Dec. 16, 2025

(54) PIEZOELECTRIC INPUT DEVICE

(71) Applicant: Microsoft Technology Licensing, LLC, Redmond, WA (US)

(72) Inventors: Kenneth Daniel Ratekin, Lynnwood, WA (US); Colin Michael Ravenscroft, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 18/119,740

(22) Filed: Mar. 9, 2023

(65) Prior Publication Data
US 2024/0299841 A1    Sep. 12, 2024

(51) Int. Cl.
*A63F 13/218*    (2014.01)
*A63F 13/235*    (2014.01)
(Continued)

(52) U.S. Cl.
CPC .......... *A63F 13/218* (2014.09); *A63F 13/235* (2014.09); *A63F 13/24* (2014.09);
(Continued)

(58) Field of Classification Search
CPC ...... A63F 13/218; A63F 13/235; A63F 13/24; A63F 13/285; G06F 3/016; G06F 3/0338; G06F 2203/015
See application file for complete search history.

(56) References Cited

U.S. PATENT DOCUMENTS 5,973,670 A * 10/1999 Barber .................... G06F 3/016
                                                        345/157
6,429,849 B1    8/2002 An et al.
(Continued)

FOREIGN PATENT DOCUMENTS

EP      3289427 B1      2/2019
WO      2018224801 A1   12/2018
WO      2023014790 A1   2/2023

OTHER PUBLICATIONS

Liu, et al., "Development of A Haptic User Interface for Surface Sensing and Nanomanipulation Based on Atomic Force Microscope", In Proceedings of 1st IEEE International Conference on Nano/Micro Engineered and Molecular Systems, Jan. 18, 2006, pp. 900-904.
(Continued)

*Primary Examiner* — Carl V Larsen
(74) *Attorney, Agent, or Firm* — Rainier Patents, P.S.

(57) ABSTRACT

The present disclosure relates to a multi-axis rotational input device (or simply "a rotational input device") including piezoelectric elements. The piezoelectric elements may be configured or otherwise implemented within a housing of the rotational input device to generate a plurality of voltages in response to forces applied to the rotational input device. The piezoelectric elements may be coupled to a plurality of sensors for detecting specific voltage values which, in turn, may be used by a controller circuit to determine a rotational position of the rotational input device at a given moment in time. The rotational position may be used in determining an input signal to be communicated with a computing device, such as a gaming console, having an application running thereon and configured to process the input signal.

20 Claims, 8 Drawing Sheets

(51) Int. Cl.
  *A63F 13/24* (2014.01)
  *A63F 13/285* (2014.01)
  *G06F 3/01* (2006.01)
  *G06F 3/0338* (2013.01)

(52) U.S. Cl.
  CPC .......... *A63F 13/285* (2014.09); *G06F 3/016* (2013.01); *G06F 3/0338* (2013.01); *G06F 2203/015* (2013.01)

(56) References Cited

U.S. PATENT DOCUMENTS

| | | | |
|---|---|---|---|
| 7,345,670 B2 | 3/2008 | Armstrong | |
| 7,554,167 B2* | 6/2009 | Vaganov | G06F 3/0338 257/730 |
| 8,350,345 B2* | 1/2013 | Vaganov | G06F 3/0338 257/419 |
| 8,730,166 B2 | 5/2014 | Mikhailov et al. | |
| 8,870,655 B2 | 10/2014 | Ikeda et al. | |
| 11,353,966 B1* | 6/2022 | Ebert | G06T 19/006 |
| 2008/0084387 A1* | 4/2008 | Mcardle | G06F 3/0213 345/158 |
| 2009/0153481 A1* | 6/2009 | Gunther | G09B 21/02 341/23 |
| 2011/0043454 A1* | 2/2011 | Modarres | G06F 3/041 345/173 |
| 2012/0041436 A1* | 2/2012 | Ullrich | A61B 34/76 606/39 |
| 2012/0194207 A1* | 8/2012 | Vaganov | G06F 3/0338 324/750.01 |
| 2013/0026257 A1* | 1/2013 | Jalal | F02M 51/0603 239/585.5 |
| 2013/0100021 A1* | 4/2013 | Larsen | A63F 13/214 345/161 |
| 2014/0274398 A1* | 9/2014 | Grant | G06F 3/016 463/37 |
| 2015/0015489 A1* | 1/2015 | Vaganov | G06F 1/1626 345/161 |
| 2016/0089601 A1 | 3/2016 | Terry | |
| 2018/0259727 A1* | 9/2018 | Grosse | G02B 6/4226 |
| 2021/0252388 A1 | 8/2021 | Vanwyk et al. | |
| 2023/0205323 A1* | 6/2023 | Watanabe | G06F 3/0487 345/161 |

OTHER PUBLICATIONS

International Search Report and Written Opinion received for PCT Application No. PCT/US2024/018284, Nov. 18, 2022, 14 pages.

* cited by examiner

PIEZOELECTRIC INPUT DEVICE

BACKGROUND

Recent years have seen rapid development in gaming and other content delivery systems, particularly in capabilities of users to interact with or otherwise communicate input signals with a computing device. Indeed, it is now common for electronic controllers to include different types of input devices that enable a user to provide a wide variety of input signals to any number of applications running on a computing device. This increase in the types and variety of digital inputs has significantly enhanced the ways in which users can interact with various applications (e.g., gaming applications) to provide a rich and fulfilling experience to end-users.

Many modern devices utilize joysticks, thumbsticks, tracking balls, and other rotation-based input devices in providing a way for users to generate rotation-based input to a computing device. While these devices provide enhanced input capabilities of controller devices, these rotation-based input devices also come with a number of limitations and drawbacks. For example, many controllers that use rotation-based input devices will break down and cause the controller(s) to be unusable. In addition, where many rotation-based input devices rely on contact-based sensors (e.g., wipers and magnetic sensors), these contact-based sensors will often become less sensitive over time resulting in dead-zones or select directional inputs that are not recognized with a high degree of reliability.

These and other problems exist in electronic controllers that make-use of joysticks, thumbsticks, and other rotation-based input devices.

SUMMARY

One or more implementations described herein relate to a multi-axis rotational input device on an electronic controller that uses piezoelectric elements in generating input signals. In one or more embodiments, the multi-axis rotational input device includes an input rod having a plurality of piezoelectric elements within a housing. The multi-axis rotational input device may also include a plurality of sensors electrically coupled to the plurality of piezoelectric elements where a force applied to the plurality of piezoelectric elements causes one or more voltages to be generated across electrical leads connected to the plurality of sensors. In one or more implementations, the electronic controller device includes a controller circuit including a processor configured to generate an input signal associated with a rotational position of the input rod based on the one or more voltages generated across the electrical leads by the plurality of piezoelectric elements. In one or more embodiments, the electronic controller device includes at least one antenna in communication with a computing device and configured to communicate the generated input signal to the computing device.

In one or more implementations, the multi-axis rotational input device is one of a thumbstick or a joystick. In one or more embodiments, the electronic controller device is a gaming controller in wireless communication with the computing device with the computing device being a gaming console.

In one or more embodiments, the controller circuit determines the rotational position of the input rod relative to an equilibrium axis of the input rod based on a combination of multiple voltages detected by two or more sensors from the plurality of sensors.

In one or more embodiments, the controller circuit generates a voltage response based on the one or more voltages that, when applied to the piezoelectric elements, causes the plurality of piezoelectric elements to actuate and apply a haptic response to the force applied to the plurality of piezoelectric elements. In one or more embodiments, the controller circuit generates the haptic response based on instructions associated with an application running on the computing device. These instructions may be executable by a processor on the controller circuit to determine a plurality of reply voltages associated with a desired counterforce force to be applied by the plurality of piezoelectric elements and cause the plurality of reply voltages to be applied to the plurality of piezoelectric elements.

In one or more embodiments, the rotational position of the input rod is determined based on the one or more voltages generated by the plurality of piezoelectric elements and without any contact-based sensors around a base of the input rod. In one or more embodiments, the plurality of piezoelectric elements includes a plurality of piezoelectric blades configured to flex in response to the force applied to the plurality of piezoelectric elements. In one or more embodiments, the plurality of piezoelectric elements includes a plurality of piezoelectric rods extending between a top and a base of the input rod.

BRIEF DESCRIPTION OF THE DRAWINGS

In order to describe the manner in which the above-recited and other features of the disclosure can be obtained, a more particular description will be rendered by reference to example implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
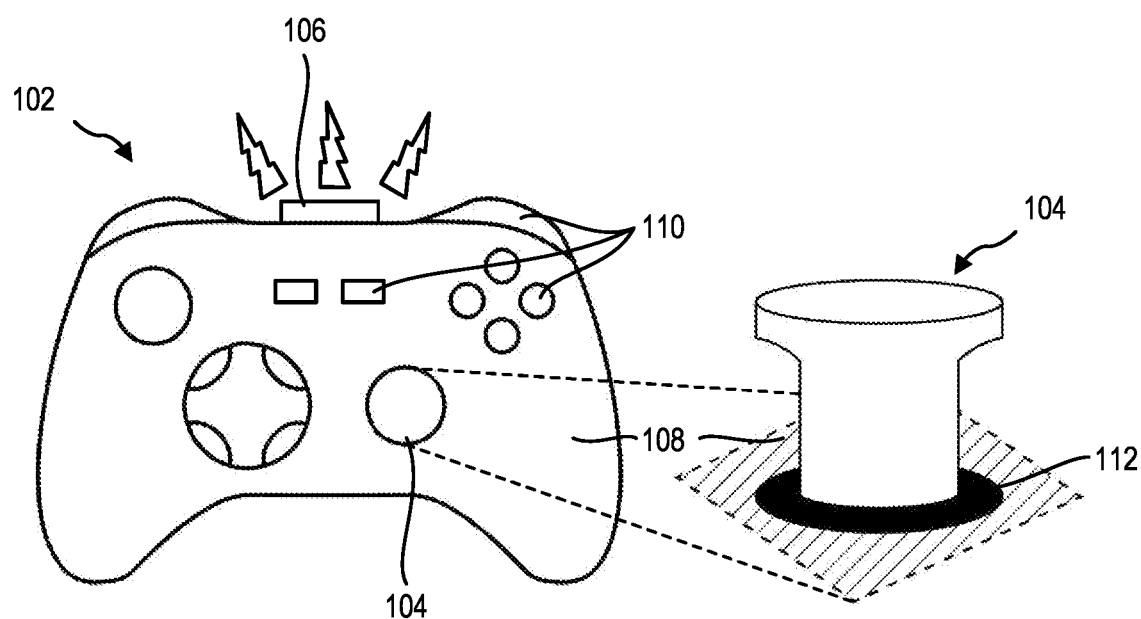
FIG. 1 is a view of an electronic controller having one or more multi-axis rotational input devices according to one or more embodiments.

The present disclosure relates to a multi-axis rotational input device (or simply "a rotational input device") including piezoelectric elements. As will be discussed in further detail below, the piezoelectric elements may be configured or otherwise implemented within a housing of the rotational input device to generate a plurality of voltages in response to forces applied to the rotational input device. Indeed, as will be discussed below, the piezoelectric elements may be coupled to a plurality of sensors for detecting specific voltage values which, in turn, may be used by a controller circuit to determine a rotational position of the rotational input device at a given moment in time. The rotational position may be used in determining an input signal to be communicated with a computing device, such as a gaming console, having an application running thereon and configured to process the input signal.

As an illustrative example, one or more implementations of the present disclosure include an electronic controller device for communicating rotation-based input data to a computing device. The electronic controller device includes a rotational input device. The rotational input device includes an input rod, which includes a plurality of piezoelectric elements within a housing of the input rod. The rotational input device additionally includes a plurality of sensors electrically coupled to the piezoelectric elements such that a force (e.g., a rotational force) applied to the piezoelectric elements causes one or more voltages to be generated across electrical leads coupling the piezoelectric elements to the sensors. The electronic controller device additionally includes a controller circuit including a processor configured to generate an input signal associated with a rotational position of the input rod based on the voltage(s) generated across the leads of the sensor(s). In one or more embodiments, the controller device includes one or more antennas in communication with a computing device and configured to transmit or otherwise communicate generated input signals to the computing device.

In addition to features of the electronic controller device and associated multi-axis rotational input device, one or more embodiments described herein involve a series of acts related to generating and communicating rotational input signals from an electronic controller to a computing device. In one or more embodiments, the electronic controller device receives a plurality of detected voltages by a plurality of sensors electrically connected to a plurality of piezoelectric elements that are contained within a housing of an input rod on the electronic controller device. The electronic controller additionally determines a rotational position of the input rod based on the detected voltages. The electronic controller device further generates at least one input signal based on the determined rotational position of the input rod. The electronic controller device transmits the input signal(s) to the computing device.

The present disclosure includes a number of practical applications that provide benefits and/or solve problems associated with conventional rotational-based input devices. Some non-limiting examples of benefits are discussed below.

For example, by implementing a plurality of piezoelectric elements within an input rod of the rotational input device, the rotational input device avoids reliance on contact-based sensors or surfaces. This avoidance of magnetic wipers and other contact-based sensors that are commonly used in conventional controller devices significantly reduces instances of dead zones (e.g., areas of the magnetic strip where the wipers are unable to actuate consistent input signals) or other common hardware failures.

In addition to avoiding certain hardware failures, the rotational input device may provide a true analog signal for use in determining a more precise position of an input rod relative to conventional contact-based sensors. Indeed, by determining a rotational position based on one or more measured voltages, the rotational input device provides a more precise rotational position than many conventional non-analog approaches, which may be useful in a variety of applications.

In addition, by using piezoelectric elements in combination with a controller circuit, one or more implementations described herein provide a mechanism for generating haptic feedback responsive to any number of rotational positions of a rotational input device. Similar to features discussed above, this is performed without relying on contact-based sensors, providing higher reliability and less breakdown of components over time. Moreover, as will be discussed below, this position-based feedback provides enhanced flexibility in the types of inputs that may be generated as well as the variety of haptic feedback that can be implemented on an electronic controller device.

In one or more embodiments, the controller circuit and an application (e.g., a gaming application) can cooperatively provide enhanced capabilities in generating input signals and associated feedback. Indeed, due to the wide range of potential voltage values that may be generated based on a range of detectable rotational positions that the rotational input device may be placed, the controller circuit and application(s) may convert the rotational position to a wide variety of potential inputs that may be communicated to a computing device. Indeed, more than simple directional inputs (e.g., right, left, up, down), the controller circuit and applications may map almost any degree of displacement or direction relative to an equilibrium position to a corresponding input signal, which may be interpreted as a wide range of independent inputs by the computing device.

As illustrated in the foregoing discussion, the present disclosure utilizes a variety of terms to describe features and advantages of one or more embodiments described herein. Additional detail will now be provided regarding the meaning of some of these terms.

As used herein, an "an electronic controller" refers to an electronic device having one or more types of input mechanisms that may be used in generating and communicating an input signal to a computing device. In one or more embodiments described herein an electronic controller refers to a gaming controller having a multi-axis rotational input device implemented thereon. Other examples may include vehicle control mechanisms (e.g., a joystick in machinery for controlling heavy equipment) or more simple input devices within a larger environment of electronics (e.g., a thumb-stick for controlling a rotational position of a mirror). Indeed, as will be discussed below, the electronic controller may include one or multiple rotational input devices having piezoelectric elements thereon that generate one or more voltages when a force is applied to the piezoelectric elements.

As used herein, a "multi-axis rotational input device" or simply "rotational input device" refers to an object on an electronic device (e.g., a controller device) capable of moving about multiple axes relative to an equilibrium axis. In one or more embodiments, the equilibrium axis is an axis that corresponds to or is representative of an equilibrium position or initial position of the rotational input device when horizontal forces are not being applied to the rotational input device. For example, where the rotational input device is a thumbstick, an equilibrium axis refers to an axis that passes between a base and a cap of the thumbstick when the thumbstick is in an equilibrium portion (e.g., when a user is not exerting vertical and/or horizontal forces to the cap or body of the thumbstick). An equilibrium axis may be a vertical axis or axis extending perpendicular from a surface of a controller device or base of the rotational input device. Other implementations of the equilibrium axis be may non-vertical or otherwise non-orthogonal to the surface of the controller device. Examples of rotational input devices include joysticks, thumbsticks, or other objects that are capable of moving about multiple axes responsive to rotational forces applied to a body of the rotational input devices.

As used herein, "piezoelectric elements" refer to elements that are capable of generating a voltage response to a force applied to the piezoelectric element. In one or more embodiments described herein, the piezoelectric elements are used specifically in connection with a rotational input device. As will be discussed below, the piezoelectric elements may be rods, blades, tubes or other piezoelectric structures that are deposited within a housing of a rotational input device. Piezoelectric elements are capable of actuating a physical or mechanical force in response to a voltage applied to the piezoelectric elements. Examples of piezoelectric elements are rods, blades, or other flexible objects that are included within a body of a rod of the rotational input device (e.g., an input rod) and which have some flexibility to bend or flex in response to rotational forces applied to the body of the rotational input device. In one or more embodiments, the piezoelectric elements refer to individual elements that each generate a respective voltage response that may be used to determine a rotational position of the rotational input device.

As used herein, a "controller circuit" refers to circuitry having a combination of hardware and/or software components that are configured to receive or otherwise detect one or more voltage values and determine, based on the voltage value(s), a rotational position of a rotational input device (e.g., an input rod of the rotational input device) at a given point in time. The controller circuit may include one or more processors or other hardware capable of executing instructions and causing the controller device to perform one or more actions, such as generating an input signal, communicating the input signal, and/or producing a voltage response to generate haptic feedback based on a rotational position of the rotational input device on the controller device. Additional detail in connection with functionality of a controller circuit is discussed below in connection with various implementations.

Additional detail will now be provided regarding one or more examples of multi-axis rotational input devices in relation to illustrative figures portraying example implementations. In one or more embodiments described herein, the rotational input device refers specifically to a thumbstick on a gaming controller. Nevertheless, it will be understood that features and functionality described in connection with example thumbsticks on example gaming controllers may similarly apply to any multi-axis rotational input device implemented on any of a variety of types of input devices and other controller devices that are capable of communicating (e.g., wirelessly or via a wired connection) with a computing device.

In an example implementation, FIG. 1 illustrates a gaming controller 102 that may be used in communicating input signals to a gaming console (or other computing device). As shown in FIG. 1, the gaming controller 102 includes a multi-axis rotational input device 104 (or simply, "rotational input device 104"). In the example shown in FIG. 1, the gaming controller 102 includes multiple rotational input devices (e.g., multiple thumbsticks).

As further shown, the gaming controller 102 includes an antenna 106 for transmitting and receiving signals from a gaming console or other computing device. In this example, the antenna 106 refers to a wireless antenna capable of wirelessly communicating with a gaming console. Other implementations of the gaming controller 102 (or other electronic controller) may communicate with a computing device via a wired connection.

As shown in FIG. 1, the gaming controller 102 includes a housing 108. The housing 108 may enclose internal components of the gaming controller 102 including sensors, circuit components, and other electronics that are commonly contained within gaming controllers 102. As further shown, the gaming controller 102 may include a plurality of buttons 110, which may be used in generating and providing any number of input signals to a computing device.

It will be appreciated that the gaming controller is provided by way of example and is not intended to limit the environment in which the rotational input device 104 is implemented. Indeed, features of the rotational input device 104 described herein may be applied to any of a variety of rotational input devices that may be used in connection with a variety of electronic controllers. Further, an electronic controller may include multiple rotational input devices of different types (e.g., joysticks, thumbsticks) on a single device or system that utilize features and functionality of the rotational input devices described herein.

As shown in FIG. 1, a side-view of the rotational input device 104 is further shown to illustrate that a base of the rotational input device 104 may pass through an opening 112 in the housing 108 of the gaming controller 102. As shown in FIG. 1, this opening 112 may provide some clearance to enable the rotational input device 104 to move laterally in response to horizontal force without causing the rotational input device 104 to come into direct contact with the housing 108 of the gaming controller 102. As will be discussed below, the rotational input device 104 may be used in generating input signals without the rotational input device 104 coming into contact with or otherwise touching a side of the opening 112. In the least, even where the rotational input device 104 comes into contact with a side of the opening 112 (e.g., a padded or cushioned portion of the housing 108 unrelated to generating input signals), the rotational input device 104 may be used to generate an input signal independent of this contact with the side of the opening 112.

Figure 2:
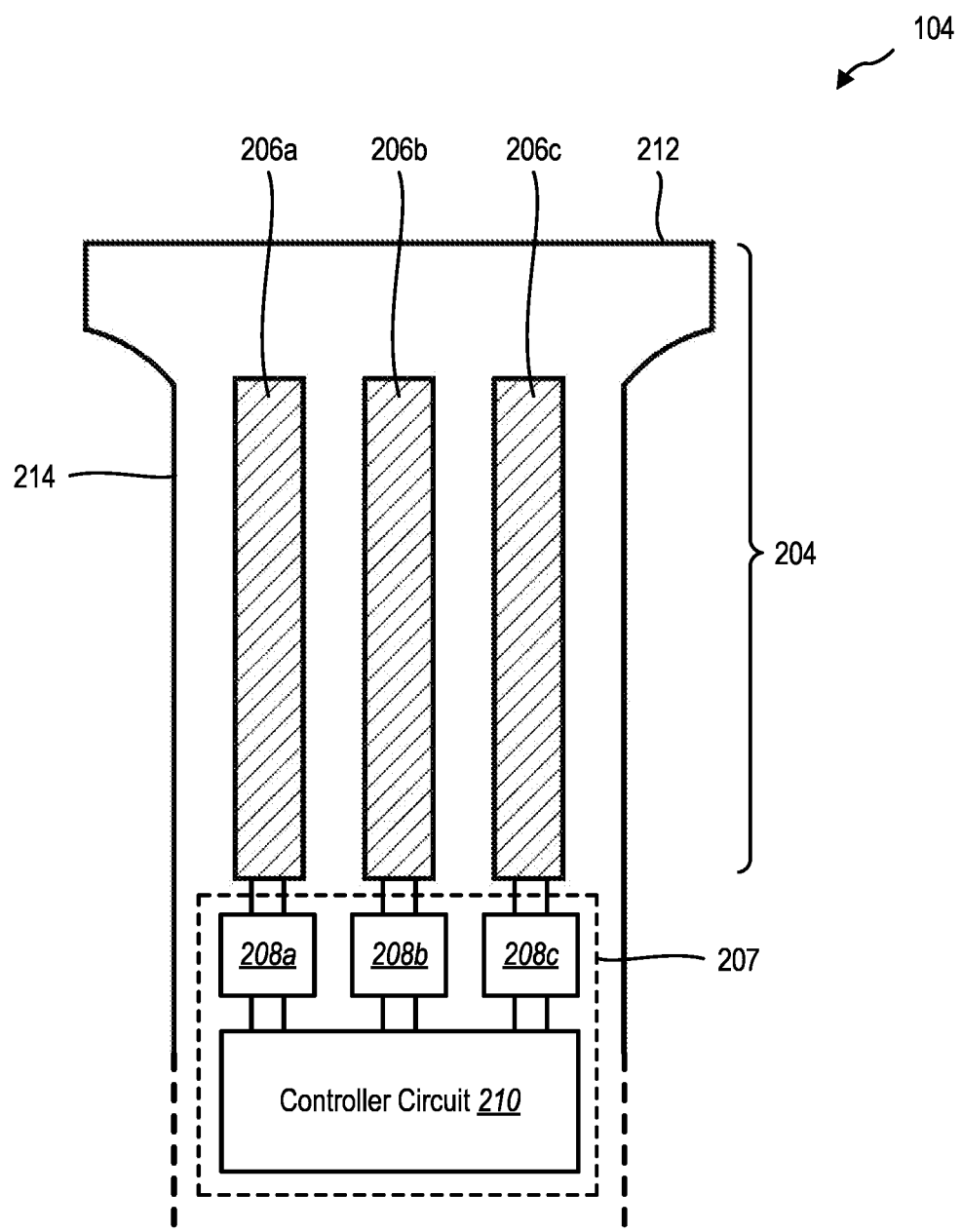
FIG. 2 illustrates an example view of a multi-axis rotational input device including piezoelectric elements therein in accordance with one or more embodiments.

FIG. 2 illustrates additional detail in connection with a view of the rotational input device 104. In particular, FIG. 2 illustrates an enlarged side view of the rotational input device 104 showing an example connection of components (e.g., a schematic view) that may be found within a housing of the rotational input device 104. It will be appreciated that this example view of the rotational input device 104 is provided as an example to illustrate connectivity of the components therein and is not necessarily to scale or representational of a cross-sectional view of the rotational input device 104

As noted above, FIG. 2 illustrates an example rotational input device 104. As shown in FIG. 2, the rotational input device 104 includes an input rod 204. In one or more embodiments, the input rod 204 refers to a portion of the rotational input device 104 extending outward from a surface (e.g., through the opening 112 in the housing 108 of the gaming controller 102). As will be discussed in further detail below, the input rod 204 may rotate about an equilibrium position in which the input rod 204 is oriented vertically from an outer surface of the gaming controller 102.

As shown in FIG. 2, the input rod 204 includes a cap 212 and a body 214 that encloses a plurality piezoelectric elements 206a-c. In one or more embodiments, the input rod 204 includes additional components (e.g., a plurality of sensors 208a-c), the controller circuit 210 and any other electrical and hardware components that are housed within the body 214 of the input rod 204. For the sake of clarity, this implementation of the rotational input device 104 includes an input rod 204 associated with an upper portion of the rotational input device 104 extending outward from an electronic controller. Similar to other rotational input devices, the rotational input device 104 may pivot around a base in response to forces exerted on the input rod 204 (e.g., a thumb or other object placed on the cap 212 of the input rod 204 and used to apply a combination of vertical and horizontal forces on the rotational input device 104).

As noted above, the input rod 204 includes a plurality of piezoelectric elements 206a-c included therein. The piezoelectric elements 206a-c may be oriented within the input rod 204 such that a force applied to the rotational input device 104 causes the piezoelectric elements 206a-c to generate a voltage across leads connecting the piezoelectric elements 206a-c to a plurality of sensors 208a-c. Indeed, as will be discussed below in connection with FIGS. 3A-3B, a force applied to the rotational input device 104 having a horizontal force may cause the rod element 204 to rotate away from an equilibrium position, which may cause a force to be applied to the piezoelectric elements 206a-c and generate a voltage across the leads connecting the piezoelectric elements 206a-c to the sensors 208a-c. As another example, and as will be discussed below in connection with FIG. 4, a vertical or downward force applied to the rotational input device 104 may cause the rod element 204 to compress or press down on the piezoelectric elements 206a-c and similarly generate a voltage response across the leads (e.g., in addition to or as an alternative to a z-press or other mechanism for detecting a downward force on a surface of the thumbstick). In some examples, the piezoelectric elements may generate haptic feedback instead of, or in response to, traditionally detected downward force on a surface of a thumbstick.

As shown in FIG. 2, the rotational input device 104 may include three piezoelectric elements 206a-c. In one or more embodiments, the rotational input device 104 may include any number of piezoelectric elements to capture a full range of rotational movement of the rotational input device 104. For example, the rotational input device 104 may include three or more piezoelectric elements oriented around an axis extending outward from a surface of the controller device (e.g., from a base of the rotational input device 104) and corresponding to an equilibrium orientation of the input rod 204. In one or more embodiments, the rotational input device 104 may include any number of piezoelectric elements based on a number of directions that the electronic controller is configured to generate. For instance, the rotational input device 104 may include four piezoelectric elements corresponding to left, right, up, and down directions. Another implementation may include eight piezoelectric elements corresponding to eight possible directional inputs. In one or more embodiments, the rotational input device 104 has a number of piezoelectric elements unrelated to a number of possible inputs, but rather based on an ability of the sensors 208a-c and controller circuit 210 to accurately determine a rotational input based on a detected position of the input rod 204 and/or to generate a greater quantity of piezoelectric haptic feedback.

As will be discussed below in connection with FIGS. 5A-5C, the piezoelectric elements 206a-c may have a variety of structures and shapes. For example, the piezoelectric elements 206a-c may refer to piezoelectric rods, piezoelectric blades, piezoelectric tubes or other combination of piezoelectric structures included within a structure of the rotational input device 104. For the sake of explanation, FIG. 2 includes three piezoelectric rods in which some or all of the rods have piezoelectric material implemented thereon. For instance, in one or more embodiments, the piezoelectric elements 206a-c refer to piezoelectric rods having piezoelectric material that extend the length of the rods. In one or more embodiments, the piezoelectric elements 206a-c include piezoelectric material on a select portion of the piezoelectric rods, such as a limited portion of the rods nearest the sensors 208a-c. In this example, the remaining portion of the piezoelectric elements 206a-c may include non-piezoelectric material capable of flexing in response to forces applied on the rotational input device 104, but where the voltage response is generated locally at the base of the piezoelectric elements 206a-c.

While one or more embodiments described herein refer specifically to piezoelectric elements that extend along a length of an input rod 204, other implementations may have piezoelectric elements deposited within a housing of the input device 104 using a variety of structures and configurations. For example, in one or more embodiments, the piezoelectric elements may be deposited at other positions along the piezoelectric rods, such as near a mid-portion or near the cap 212 of the input rod 204 (e.g., to reduce sensitivity in the detected voltages). In one or more embodiments, the piezoelectric elements may be deposited as stacks of discs, rings, or layers that are oriented about a central axis of the input rod 204 or along other axes to provide additional variety and granularity in determining a rotational position of the input rod 204.

As shown in FIG. 2, the rotational input device 104 additionally includes a plurality of sensors 208a-c at a base of the piezoelectric elements 206a-c. In the example shown in FIG. 2, the rotational input device 104 includes a sensor for each of the piezoelectric elements 206a-c. For example, a first piezoelectric element 206a is coupled to a first sensor 208a via first electrical leads (e.g., a first pair of electrical leads), a second piezoelectric element 206b is coupled to a second sensor 208b via second electrical leads (e.g., a second pair of electrical leads), and a third piezoelectric element 206c is coupled to a third sensor 208c via third electrical leads (e.g., a third pair of electrical leads). As noted above, other implementations may include any number of piezoelectric elements, which may each be coupled to corresponding sensors that are capable of detecting a voltage across leads connecting the piezoelectric elements to the corresponding sensors.

As further shown, rotational input device 104 may include a controller circuit 210. The controller circuit 210 may include a processor and any additional circuitry capable of reading the voltage values from the sensors 208a-c and determining a position of the input rod 204 relative to an equilibrium axis. In the example shown in FIG. 2, the controller circuit 210 is coupled to the plurality of sensors 208a-c and receives voltage values detected by the sensors 208a-c for processing. Upon receiving voltage values, the controller circuit 210 may process the voltage values to determine a rotational position of the input rod 204 at a point in time that the voltages were detected.

In addition to determining the rotational position of the input rod 204, the controller circuit 210 may generate an input signal associated with the rotational position of the input rod 204. For example, the controller circuit 210 may include or have access to mapping information indicating voltage values and corresponding rotational positions of the input rod 204 when the associated voltage values are being generated by the piezoelectric elements 206a-c. Based on this mapping information and the detected voltage values, the controller circuit 210 may generate an input signal indicating the rotational position mapped to the detected voltage values within the mapping information.

While FIG. 2 illustrates an example implementation in which the controller circuit 210 and sensors 208a-c are independent components, in one or more embodiments, the rotational input device 104 includes a controller system 207 in which the respective components are within a single circuit or system on a chip (SOC). For example, in one or more embodiments, the sensors 208a-c and controller circuit 210 may be implemented on a printed circuit board (PCB), a single SOC, or a combination of circuit components, such as an integrated circuit having a processor that is coupled to sensor components within an interconnected circuit of electronic components. Thus, while FIG. 2 shows an example in which electrical leads connect the piezoelectric elements 206a-c to the sensors 208a-c and another pair of leads connect the sensors 208a-c to the control circuit 210, in one or more embodiments, the piezoelectric elements 206a-c are connected to a controller system 207 including both the sensors 208a-c and the controller circuit 210 via a single set of leads. In a similar fashion, as will be discussed in further detail below, the controller circuit 210 may generate and apply a response voltage to the piezoelectric elements 206a-c to create a haptic response to the forces applied to the input rod 204 of the rotational input device 104.

Figure 3B:
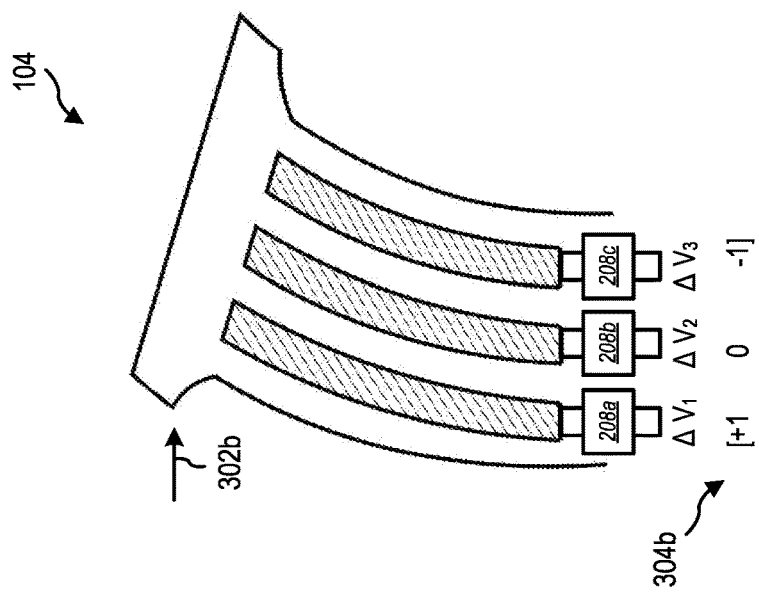
FIG. 3A-3B illustrate example views of the multi-axis rotational input device based on forces applied to the input device in accordance with one or more embodiments.
Figure 3A:
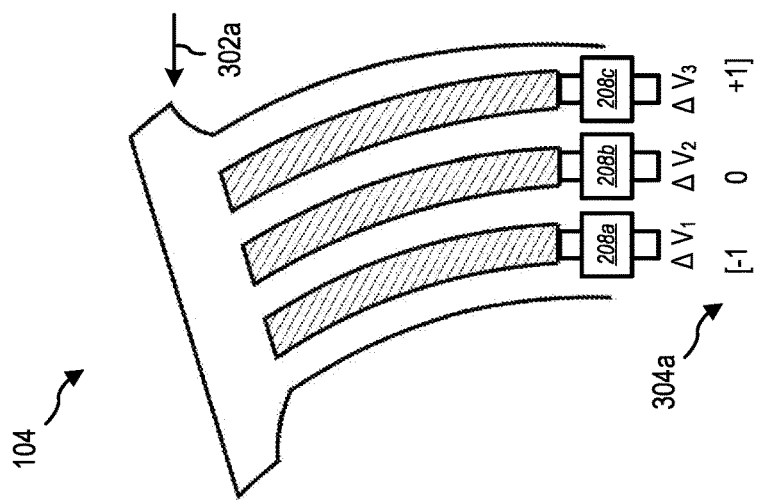

As discussed above, the piezoelectric elements 206a-c of the rotational input device 104 may generate a voltage response based on forces that are applied to a body (e.g., a cap 212 or other portion of the input rod 204) of the rotational input device 104 and which cause forces to be applied to the piezoelectric elements 206a-c. FIGS. 3A-3B provide example implementations showing possible effects of lateral forces (e.g., rotational forces having different lateral elements) being applied to the input rod 204 of the rotational input device 104.

For example, FIG. 3A illustrates a first example in which a lateral force 302a is applied to the rotational input device 104. In one or more embodiments, this lateral force 302a may be applied from a thumb or other finger coming into contact with the cap portion of the rotational input device 104 and applying the lateral force 302a in a lateral direction. As will be discussed below, the lateral force 302a may simply refer to the lateral portion of a force (e.g., a rotational force) including both a downward and lateral element, which is a common force that would be applied to a thumbstick or other type of rotational input device 104. For the sake of simplicity, this implementation may refer primarily to a lateral force 302a applied to the rotational input device 104.

As shown in FIG. 3A, in response to the lateral force 302a, the piezoelectric elements may bend, flex, compress, or otherwise respond to the lateral force 302a. In this example, the piezoelectric elements bend in the direction of the lateral force 302a resulting in a force applied to the piezoelectric portion of the piezoelectric elements. As a result of the force applied to the piezoelectric portion(s) of the piezoelectric elements, the plurality of sensors 208a-c may detect a change in the potential or voltage applied across electrical leads connecting the piezoelectric elements to the corresponding sensors 208a-c.

In the illustrated example, the sensors 208a-c detect a plurality of voltages generated by the plurality of piezoelectric elements. For instance, the first sensor 208a detects a first voltage ($\Delta V_1$) indicating a change in potential across the leads from the first piezoelectric element. As further shown, the second sensor 208b detects a second voltage ($\Delta V_2$) indicating a change in potential across the leads from the second piezoelectric element. As further shown, the third sensor 208c detects a third voltage ($\Delta V_3$) indicating a change in potential across the leads from the third piezoelectric element. Other implementations may include additional detected voltages across any number of piezoelectric elements.

In the example shown in FIG. 3A, the respective voltage values make up a plurality of voltages 304a that are reflective of the lateral force 302a applied to the rotational input device 104. For example, where the lateral force 302a results in compressive pressure or downward force applied to the first piezoelectric element, a resulting first voltage ($\Delta V_1$) may read "−1" indicating a potential drop of one volt across the leads read by the first sensor 208a. Conversely, where the lateral force 302a results in a decompressive or expansive force applied to the third piezoelectric element, a resulting third voltage ($\Delta V_3$) may read "+1" indicating a potential increase of one volt across the leads read by the third sensor 208c. In the illustrated example, the force applied to the second piezoelectric element may be a neutral force resulting in a second voltage ($\Delta V_2$) of "0" indicating zero (or otherwise negligible) potential change across the leads read by the second sensor 208b.

In one or more embodiments, the plurality of voltages 304a are provided as inputs to the controller circuit 210 for further processing. In particular, the controller circuit 210 receives or otherwise reads the detected plurality of voltages 304a and determines a rotational position of the input rod 204 relative to an equilibrium axis based on the voltage values of the plurality of voltages 304a.

The controller circuit 210 may determine the rotational position based on the voltage values in a number of ways. In one or more embodiments, the controller circuit 210 may simply associate voltage values of individual piezoelectric elements with a direction (e.g., a lateral direction) of the input rod 204. In this example, the specific voltage value may be associated with an amount of displacement in a particular direction. For instance, where the rotational input device 104 includes four piezoelectric elements, each of the piezoelectric elements may be associated with a respective direction with a voltage value indicating an amount of displacement in the respective direction. In another example in which the rotational input device 104 includes eight or nine piezoelectric elements, each of the elements may be associated with a respective direction (e.g., up, down, left, right, diagonals, and downwards pressure) and the specific voltage values may be used to determine a specific rotational position. In the example shown in FIG. 3A, the "−1" value of the first voltage may indicate a left input or left direction of the input rod 204 while other "0" or positive values are discounted, ignored, or considered in combination with the "−1" value.

In one or more embodiments, the controller circuit 210 maintains mapping information indicating rotational positions of the input rod 204 corresponding to any number of combinations of voltage values. For example, the combination of voltage values [−1, 0, +1] may be pre-associated or otherwise mapped to a rotational position of the input rod 204. Based on the mapping information, the controller circuit 210 perform a lookup and determine that the combination of [−1, 0, +1] corresponds to a left input. In one or more embodiments, the controller circuit 210 considers more granular voltage values and may determine a specific degree of direction (e.g., far left, middle left, slight left) based on a variable range of voltage values. For example, a plurality of voltages reading [−0.5, 0, +0.5) may be a similar rotational direction as shown in FIG. 3A, but corresponding to a lower degree of displacement from the equilibrium position than the example shown in FIG. 3A.

The controller circuit 210 may map the measured voltage values to corresponding input signals in a variety of ways. For example, in one or more implementations, the controller circuit 210 considers a table of values with each permutation of voltage values being mapped to a corresponding input. In this example, the controller circuit 210 may determine which value from the table is closest to a measured value and determine an input based on that determination. In one or more embodiments, the controller circuit 210 utilizes an algorithm or other model to determine an input based on an application of the algorithm or model to the set of measured voltage values. The algorithm and/or table of values may differ between different embodiments based on sensitivity of the piezoelectric elements, based on a number of the piezoelectric elements, and other differences between implementations of the input device 104 described herein. In some examples (e.g., where one of the piezoelectric elements is used for detecting downward force), only a subset of the piezoelectric elements may be considered in determining the rotational position and associated input signal.

In addition, while one or more embodiments described herein refer to an example orientation of the input rod 204 in which the piezoelectric elements within the input rod 204 are perpendicular to a surface of an input device (when in an equilibrium position), other implementations may have different equilibrium rotational positions and may have different degrees of orientation relative to the illustrated examples of the rotational input device 104 described herein. Indeed, other implementations may use non-cardinal directional vectors to determine directional input signals in accordance with a variety of examples and applications. In these examples, the particular algorithms, models, and/or tables for determining input signals based on detected rotational positions may combine or otherwise pre-process the vector results prior to application of differ from-the techniques discussed above in connection with the perpendicularly oriented input device 104.

FIG. 3B shows many similar features as the example discussed above in connection with FIG. 3A. In this example, a second lateral force 302b is applied to the rotational input device 104. This second lateral force 302b may be applied from a thumb or other finger coming into contact with the cap portion of the rotational input device 104 and applying the second lateral force 302b in the opposite lateral direction as the first lateral force 302a. The second lateral force 302b may refer to a similar component of a rotational force as the first lateral force 302a discussed above in connection with FIG. 3A.

As shown in FIG. 3B, in response to the second lateral force 302b, the piezoelectric elements may bend, flex, compress, or otherwise respond to the second lateral force 302b. Similar to the example discussed above, the piezoelectric elements may cause a voltage to be generated and detected by the sensors 208a-c in response to the force applied to the piezoelectric portion(s) of the piezoelectric elements within the input rod 204. Similar to the example of FIG. 3A, the sensors 208a-c may detect a second plurality of voltages 304b generated by the piezoelectric elements. More specifically, as shown in FIG. 3B, the plurality of voltages 304b may read [+1, 0, −1] based on the compressive force applied to the third piezoelectric element, the neutral force applied (or lack of force applied) to the second piezoelectric element, and the decompressive force applied to the first piezoelectric element.

Similar to the example discussed above, the controller circuit 210 may read the voltage values and determine a rotational position of the input rod 204 relative to an equilibrium axis of the rotational input device 104. In this example, the controller circuit 210 may determine that the combination of voltage values corresponds to a right direction of the rotational input device 104 (e.g., opposite the direction illustrated in FIG. 3A).

Figure 4:
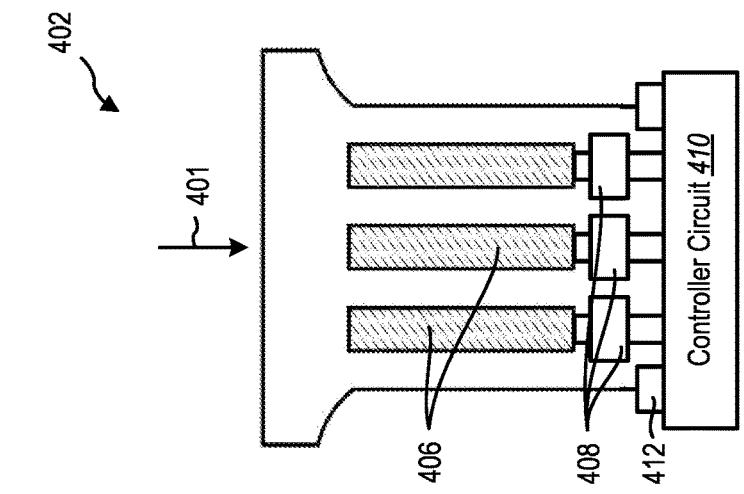
FIG. 4 illustrates an example view of another example implementation of the multi-axis rotational input device based on a downward force applied to a cap of the input device.

While FIGS. 3A and 3B illustrate examples in which lateral forces are applied to the rotational input device 104 and cause voltages to be generated and processed by the controller circuit 210 to determine rotational displacement of the input rod 204, FIG. 4 illustrates an example in which a compressive or downward force is applied to the cap of a rotational input device.

In particular, as shown in FIG. 4, a downward force 401 is applied to a cap of a rotational input device 402. In this example, the downward force 401 is applied to the cap of the rotational input device 402 in a downward direction that aligns with the equilibrium axis of the rotational input device 402. Thus, a similar compressive force may be applied to each of the multiple piezoelectric elements, which would likely translate to a similar set of voltages (e.g., voltages of similar or equal values) detected by the plurality of sensors 408. In the event a lateral component of a force is applied to the cap of the rotational input device 402, the voltages may vary from one another in a similar manner as the examples discussed above in connection with FIGS. 3A-3B. Indeed, in one or more embodiments, the voltage values may be provided to a controller circuit 410, which may determine a rotational position, such as a lack of rotational displacement in the illustrated example, as well as a degree of the downward force 401 based on the voltages generated by the piezoelectric elements.

In addition, or as an alternative, to the voltage values generated by the piezoelectric elements, the controller circuit 410 may additionally consider input signals based on compression of one or more physical buttons, switches, or other tactile input devices that may be pressed or otherwise actuated in response to the downward force 401. In this example, the downward force 401 applied to the cap of the rotational input device 402 may cause a body of the rotational input device 402 to press downward and press one or more physical buttons 412 (or other mechanical-based input) to indicate a corresponding input by a user.

Thus, in one or more embodiments, the rotational input device 402 may include a combination of piezoelectric elements and physical buttons that a controller circuit 410 uses to determine a variety of input signals. Indeed, as indicated above, a force applied to a cap of the rotational input device 402 may include a combination of lateral and downward forces, which may cause both rotational displacement and one or more buttons to be pressed. In one or more embodiments, the controller circuit 410 may interpret the combination of detected voltage values and the indication of the pressed button(s) 412 in determining a specific set of input signal(s) to provide to a computing device.

As noted above, the piezoelectric elements may include a variety of structures and configurations within the input rods 204 of the rotational input devices. By way of example and not limitation to a specific number or configuration or structure of the piezoelectric elements, FIGS. 5A-5C provide some example implementations that may be used in connection with any of the above examples.

Figure 5A:
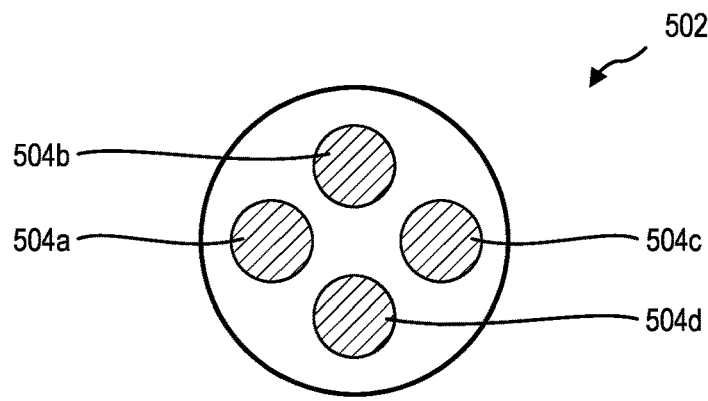
FIGS. 5A-5C illustrate cross-sectional views of the multi-axis rotational input device showing example implementations of the piezoelectric elements within the input device.

For example, FIG. 5A illustrates a first example cross section 502 of an input rod showing an example configuration of piezoelectric elements that may be placed or otherwise deposited within a body of the input rod. In this example, the piezoelectric elements include four piezoelectric rods 504a-d having cylindrical shapes that are placed at respective positions within the input rod of a rotational input device. The piezoelectric rods 504a-d may provide similar features and functionality as piezoelectric elements discussed above in connection with FIGS. 2-4.

As an illustrative example, each of the piezoelectric rods 504a-d may generate voltage responses based on downward and/or lateral forces that are applied to the input rod and which cause a displacement of the input rod relative to an equilibrium axis. In one or more embodiments, each of the four piezoelectric rods 504a-d provide voltages that correspond to respective directions or vectors. For instance, a voltage generated by a first rod 504a may correspond to a first vector (e.g., a lateral direction) relative to an equilibrium axis while voltages generated by the second rod 504b, third rod 504c, and/or fourth rod 504d correspond to second, third, and fourth vectors, respectively. Other examples may include additional piezoelectric rods that provide additional accuracy and/or an additional variety of input signals that may be recognized and/or generated by a controller circuit that is coupled to the piezoelectric rods.

While FIG. 5A shows an example showing four piezoelectric rods 504a-d, other examples may include similarly shaped tubes, rings, or other configuration of piezoelectric elements that extend at least a portion of the length of the input rod. Further, the piezoelectric rods 504a-d may be made from a solid material or hollow material. Each of these respective configurations and shapes may be defined by types of movement or application in which the rotational input device will be used.

Figure 5B:
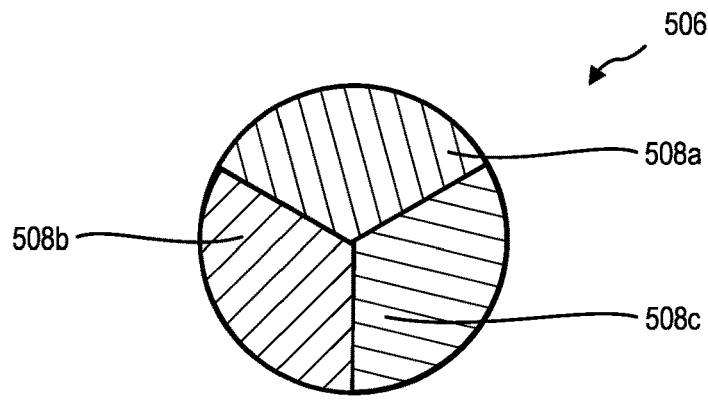

FIG. 5B illustrates another example cross section 506 of an input rod showing an example configuration of piezoelectric elements that may be placed or otherwise deposited within a body of the input rod. In this example, a plurality of piezoelectric elements 508a-c includes a first piezoelectric element 508a, a second piezoelectric element 508b, and a third piezoelectric element 508c that fill a portion of an interior of the input rod. For example, the piezoelectric elements 508a-c may substantially fill a void or inner volume of the input rod. While not shown in FIG. 5B, each of these elements may include some separation and/or non-conductive layer to prevent voltages generated by the respective piezoelectric elements from matching due to a shorted connection between the respective piezoelectric elements 508a-c. By substantially filling the interior of the input rod in this manner, movement or flexing of the input rod will cause the piezoelectric elements to also flex more uniformly and enable the controller circuit coupled to the piezoelectric elements 508a-c to determine a very accurate position of the input rod of the rotational input device.

Figure 5C:
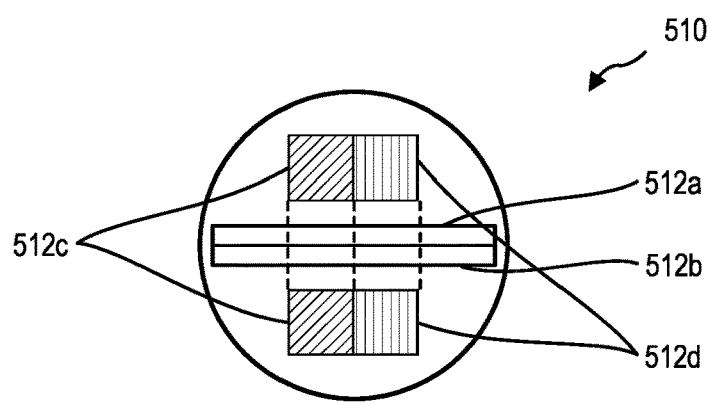

FIG. 5C illustrates another example cross section 510 of an input rod showing an example configuration in which a combination of piezoelectric rods and piezoelectric blades are included within a body of the input rod. In this example, a first piezoelectric element 512a may be a first piezoelectric blade while a second piezoelectric element 512b is a second piezoelectric blade. As further shown, a third piezoelectric element 512c may include a combination of connected piezoelectric rods and a fourth piezoelectric element 512d may include another combination of connected piezoelectric rods.

The combination of blades and rods may provide additional flexibility in the types of rotational inputs that may be produced and recognized by the rotational input device. For example, the piezoelectric blades may flex in first and second directions (e.g., up and down) while the piezoelectric rods may flex in third and fourth directions (e.g., left and right). In this example, the respective directions may refer to directions in a three-dimensional (3D) space in which an equilibrium axis is a z-axis, up and down directions are opposite directions along a y-axis, and left and right directions are opposite directions along an x-axis, with the x, y, and z axes corresponding to 3D cardinal x, y, and z axes. This combination may provide additional accuracy that piezoelectric blades may provide while still allowing the rotational input device to flex in a wide variety of different directions.

Other structure of the piezoelectric elements may be used. For example, in one or more embodiments, the piezoelectric elements may be spring structures that provide additional flexibility and sensitivity relative to some of the example implementations described herein. Other implementations may include any combination of the structures described herein. Moreover, as indicated above, the various piezoelectric element structures may be used in different types of rotational input devices, such as joysticks, thumbsticks, and other rotation-based input devices.

Figure 6B:
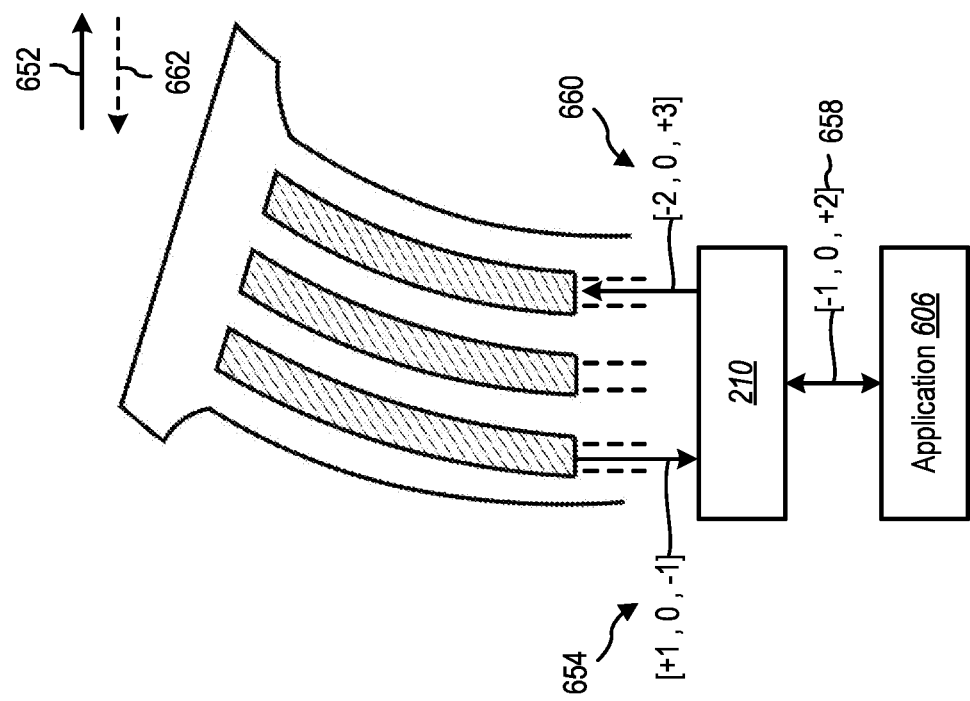
FIGS. 6A-6B illustrate an example implementation in which a controller circuit generates a voltage response for actuating haptic feedback on the multi-axis rotational input device.

In addition to providing a mechanism for determining a rotational position of an input rod and, based on the rotational position, determining a corresponding input signal, the implementations described herein may further provide features and functionality related to providing feedback based on the detected rotational position of the input rod. Indeed, FIGS. 6A-6B illustrate example implementations in which the controller circuit and piezoelectric elements may cooperatively generate and provide a haptic feedback response based on a determined rotational position.

Figure 6A:
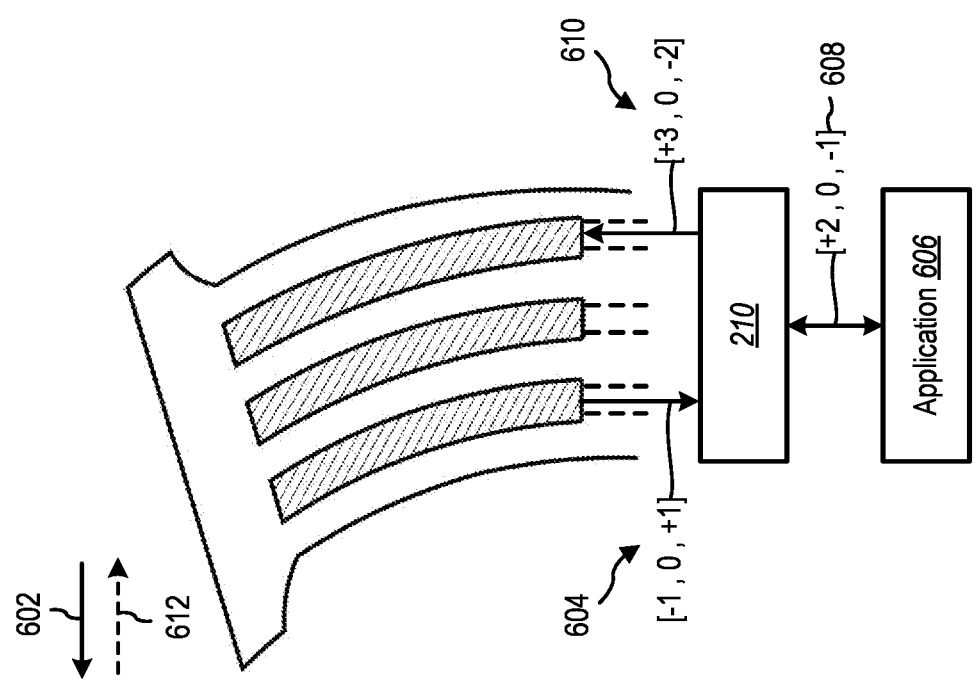

For example, FIG. 6A illustrates an example in which a first lateral force 602 is applied to a body of the rotational input device. Similar to one or more embodiments described above, this may be caused by a thumb or finger coming into contact with a cap of the rotational input device and applying the first lateral force 602 in a manner that causes the input rod to flex or otherwise be displaced in a corresponding direction of the first lateral force 602.

Similar to the example described above in connection with FIG. 3A, the piezoelectric elements may generate a first plurality of voltages 604 based on the forces applied to the respective piezoelectric elements (caused by the first lateral force 602). The first plurality of voltages 604 may be detected by corresponding sensors and provided to the controller circuit 210. The controller circuit 210 may process the first plurality of voltages 604 to determine a rotational position of the input rod.

In addition to the examples discussed above describing how the controller circuit 210 may determine the rotational position, in one or more embodiments, the controller circuit 210 receives data from an application 606 (e.g., a gaming application) indicating mapping information and/or input data that enables the controller circuit 210 to determine input signals that correspond to the determined rotational position(s) of the input rod. Indeed, it is possible that different applications may provide different input data in which different rotational positions are mapped to different input signals, which may be associated with different tasks altogether to be performed by a computing device having the application executing thereon.

In addition to information associated with specific input signals and types of inputs associated with respective rotational positions, the application 606 may additionally provide feedback data indicating instructions for generating a haptic response to the first lateral force 602 based on a determined rotational position of the input rod. For example, as shown in FIG. 6A, the first plurality of voltages 604 generated by the piezoelectric elements may read [−1, 0, +1] based on the different forces applied to the piezoelectric elements. The application 606 may additionally provide a set of voltages 608 associated with some metric of force (e.g., 0.5 newtons of lateral or other rotational force) that, when applied to the piezoelectric elements (e.g., via leads connecting the piezoelectric elements to the controller circuit 210), causes a counterforce 612 or haptic feedback to be applied in response to the first lateral force 602.

In the example shown in FIG. 6A, the application 606 provides a specific set of voltage values 608 that read [+2, 0, −1] associated with a corresponding metric of a desired counterforce. As shown in FIG. 6A, the controller circuit 210 may consider the combination of the first plurality of voltages 604 and the set of voltages 608 associated with the desired counterforce to determine a reply voltage or voltage response (e.g., a set of reply voltages 610) to apply to the piezoelectric elements. In this example, the set of reply voltages 610 read [+3, 0, −2] corresponding to voltages that, when applied to the piezoelectric elements that are generating the first plurality of voltages 604, would cause the set of voltages 608 provided by the application 606 to be the sum of voltages applied to the piezoelectric elements. While this example shows a reply voltage 610 that, in combination with the input voltage 604, is a sum of the set of voltages 608 provided by the application 606, other examples may involve determining different reply voltage values based on a desired force of the counter force 612 or other capabilities of the input device. This sum of voltages equal to or otherwise corresponding to the set of voltages 608 provided by the application 606 would cause the piezoelectric elements to exert the counter force 612 and provide haptic feedback to the force applied by the user to the cap of the rotational input device.

The amount and degree of haptic feedback may vary between rotational input devices and between different applications. Indeed, different applications may be programmed to coordinate different degrees of force across different applications even between different tasks or sessions within the same application. For example, different user profiles in gaming applications (or other applications) may be associated with different types of haptic responses that correspond to different sets of voltages that would need to be applied to the piezoelectric elements to generate the variety of haptic responses.

In one or more embodiments, the haptic response may vary in force based on different degrees of displacement by the input rod. For example, a small displacement (e.g., less than a threshold degree of displacement) may be associated with haptic feedback that has a relatively small amount of counter force to a corresponding lateral force applied to the cap of the input rod. Conversely, a large displacement (e.g., greater than a threshold degree of displacement) may be associated with haptic feedback that has a larger amount of counter force to a corresponding lateral force applied to the cap of the input rod.

FIG. 6B illustrates another example including many similarities to the example discussed above in connection with FIG. 6A. For example, FIG. 6B illustrates an example in which a second lateral force 652 is applied to a body of the rotational input device. In response to the second lateral force 652, the piezoelectric elements may generate a second plurality of voltages 654 based on the forces applied to the respective piezoelectric elements (caused by the second lateral force 652). As shown in FIG. 6B, the second plurality of voltages 654 may read [+1, 0, −1] based on the forces applied to the piezoelectric elements as a result of the second lateral force 652.

Similar to the example discussed above in connection with FIG. 6A, the application 606 may provide a set of voltages 658 associated with a metric of force (e.g., 0.5 newtons) that, when applied to the piezoelectric elements, causes a counterforce 662 or haptic feedback to be applied in response to the second lateral force 652. In this example, the application 606 provides a set of voltage values 658 that read [−1, 0, +2] associated with the corresponding metric of the desired counterforce. The controller circuit 210 may consider the combination of the second plurality of voltages 654 and the provided set of voltages 658 to determine a voltage reply or a set of reply voltages 660 that read [−2, 0, +3] corresponding to voltages that, when applied to the piezoelectric elements that are generating the second plurality of voltages 654, would cause the set of voltages 658 to be the sum of voltages applied to the piezoelectric elements. Similar to above, the piezoelectric elements would generate the counterforce 662 responsive to the second lateral force 652, resulting in a haptic pushback to the force applied by a user on the cap of the rotational input device.

In one or more embodiments described herein, the configuration of piezoelectric elements (e.g., rods, blades, tubes) includes piezoelectric elements in each direction to provide complimentary input forces and output forces. In one or more embodiments, pairs of adjacent or connected piezoelectric elements are configured to ensure opposing and/or congruent polarity of the respective pairs of piezoelectric elements. By ensuring this relative (e.g., congruent or opposing) polarity across piezoelectric elements, the input device may provide additional capability to detect an input force and generate an output force.

Figure 7:
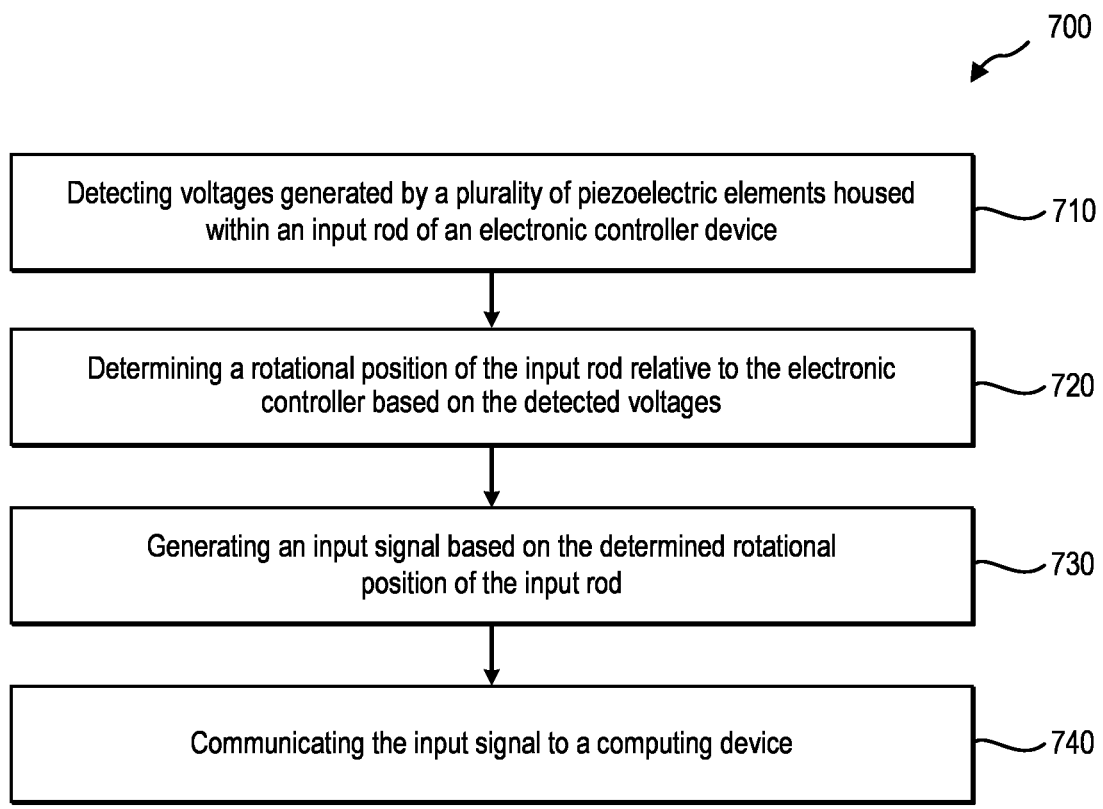
FIG. 7 illustrates an example series of acts performed by a controller circuit in generating and communicating input signals based on forces applied to a multi-axis rotational input device in accordance with one or more embodiments.
Figure 8:
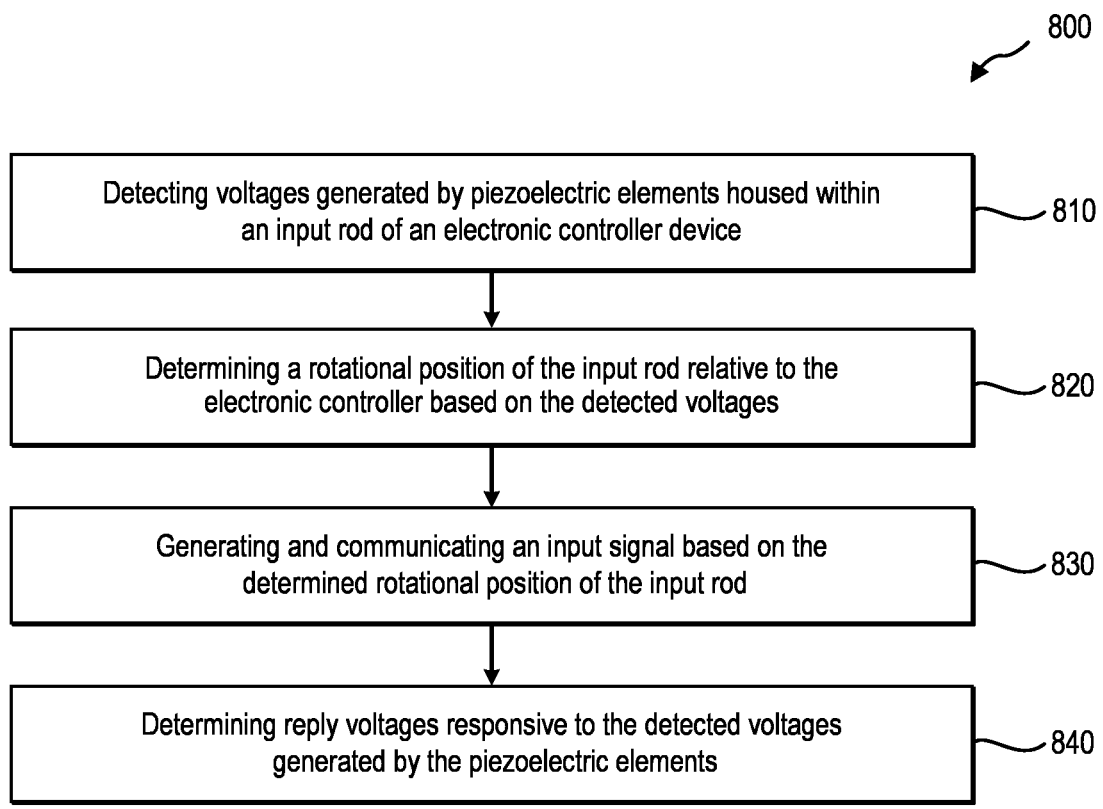
FIG. 8 illustrates an example series of acts performed by a controller circuit in generating input signals and haptic feedback responsive to forces applied to a multi-axis rotational input device in accordance with one or more embodiments.

Turning now to FIGS. 7-8, these figures illustrate example flowcharts including series of acts for determining a rotational position of a rotational input device based on voltages generated by piezoelectric elements and, based on the rotational position, generating an input signal for processing by a computing device. In one or more embodiments, the acts may be performed by a controller circuit (and/or processor included within the controller circuit) coupled to components of a rotational input device.

While FIGS. 7-8 illustrates acts according to one or more embodiments, alternative embodiments may omit, add to, reorder, and/or modify any of the acts shown in FIGS. 7-8. The acts of FIGS. 7-8 can be performed as part of a method. Alternatively, a non-transitory computer-readable medium can comprise instructions that, when executed by one or more processors, cause a computing device (e.g., input device, gaming console, client device) to perform the acts of FIGS. 7-8. In still further embodiments, a system can perform the acts of FIGS. 7-8.

FIG. 7 illustrates a series of acts 700 for generating and communicating rotation-based input data using an electronic controller device. As shown in FIG. 7, the series of acts 700 includes an act 710 of detecting voltages generating by a plurality of piezoelectric elements housed within an input rod of an electronic controller device. For example, in one or more embodiments, the act 710 involves receiving, a plurality of detected voltages by a plurality of sensors electrically connected to a plurality of piezoelectric elements, the plurality of piezoelectric elements being contained within a housing of an input rod on the electronic controller device.

As further shown, the series of acts 700 includes an act 720 of determining a rotational position of the input rod relative to the electronic controller based on the detected voltages. In one or more embodiments, the act 720 involves determining, a rotational position of the input rod based on the plurality of detected voltages.

As further shown, the series of acts 700 includes an act 730 of generating an input signal based on the determined rotational position of the input rod. In one or more embodiments, the act 730 involves generating at least one input signal based on the determined rotational position of the input rod. As further shown, the series of acts 700 includes an act 740 of communicating the input signal to a computing device. In one or more embodiments, the act 740 involves transmitting the at least one input signal to the computing device.

In one or more embodiments, the series of acts 700 additionally includes an act of determining a voltage response based on the plurality of detected voltages. In one or more embodiments, the series of acts 700 includes an act of applying the voltage response to leads connecting the plurality of sensors to the plurality of piezo electric elements where applying the voltage response causes a haptic response to a force applied to the input rod. In one or more embodiments, determining the voltage response is further based on instructions received from an application running on the computing device.

In one or more embodiments, the at least one input signal to the computing device is transmitted via one of a wired connection with the computing device or a wireless connection between the electronic controller device and the computing device. In one or more embodiments, the rotational position of the input rod is determined without any contact-based sensors around a base of the input rod.

Similar to FIG. 7, FIG. 8 illustrates a series of acts 800 related to a rotation-based input device generating and communicating rotation-based input data as well as generating a haptic response to a force applied to an input rod of the rotation-based input device. As shown in FIG. 8, the series of acts 800 includes an act 810 of detecting voltages generated by piezoelectric elements housed within an input rod of an electronic controller device. As further shown in FIG. 8, the series of acts 800 includes an act 820 of determining a rotational position of the input rod relative to the electronic controller based on the detected voltages. As further shown, the series of acts 800 includes an act 830 of generating and communicating an input signal based on the determined rotational position of the input rod. It will be appreciated that acts 810-830 may include similar features as acts 710-740 discussed above in connection with FIG. 7.

As further shown in FIG. 8, the series of acts 800 includes an act 840 of determining reply voltages responsive to the detected voltages generated by the piezoelectric elements. For example, the act 840 may include determining a voltage response based on a plurality of detected voltages (e.g., input voltages that are generated based on an input force applied to an input rod of the input device).

As further shown in FIG. 8, the series of acts 800 includes an act 850 of generating a haptic response by causing the reply voltages to be applied to the piezoelectric elements. In one or more embodiments, the act 850 includes applying the voltage response to leads connecting the plurality of sensors to the plurality of piezo electric elements where applying the voltage response causes a haptic response to a force applied to the input rod. In one or more embodiments, determining the voltage response is based on instructions received from an application running on the computing device.

Figure 9:
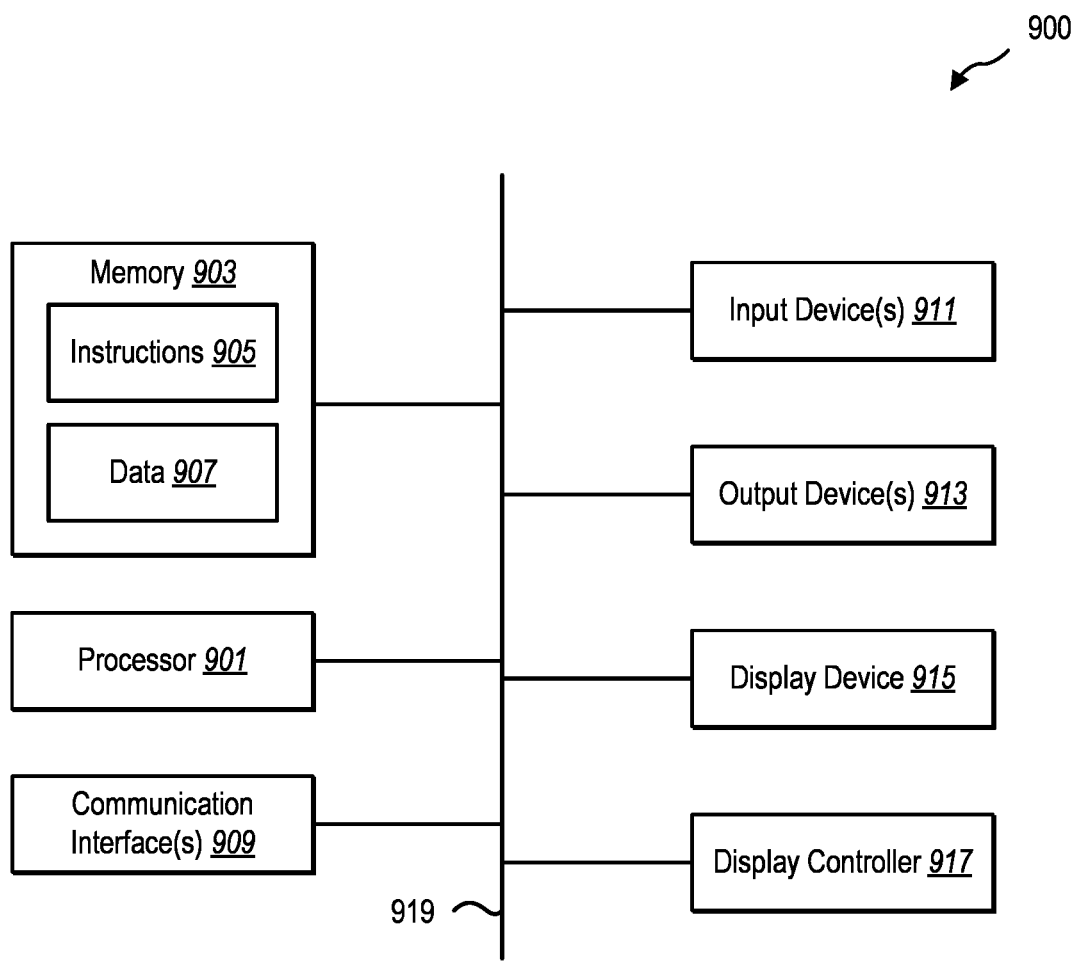
FIG. 9 illustrates certain components that may be included within a computer system.

FIG. 9 illustrates certain components that may be included within a computer system 900. One or more computer systems 900 may be used to implement the various devices, components, and systems described herein.

The computer system 900 includes a processor 901. The processor 901 may be a general-purpose single-or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

Moreover, while one or more specific embodiments of the present disclosure are described herein, these described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic controller device comprising:
   a housing:
   an input rod comprising a body extending upwardly from the housing and a plurality of piezoelectric elements within the body;
   a plurality of sensors electrically coupled to the plurality of piezoelectric elements, wherein a force applied to the plurality of piezoelectric elements is configured to cause voltages to be generated across electrical leads connected to the plurality of sensors; and
   a controller circuit including a processor configured to generate an input signal associated with a rotational position of the input rod experiencing the force based on the voltages, and the controller circuit is configured to generate reply voltages based on the one or more voltages associated with the generated input signal that when applied to the plurality of piezoelectric elements are configured to cause the plurality of piezoelectric elements to actuate and apply a desired counterforce to the body.

2. The electronic controller device of claim 1, wherein the input rod is one of a thumbstick or a joystick.

3. The electronic controller device of claim 1, wherein the electronic controller device is a gaming controller configured to wirelessly communicate with a computing device, and wherein the computing device is a gaming console.

4. The electronic controller device of claim 1, wherein the controller circuit is configured to determine the rotational position of the input rod relative to an equilibrium axis of the input rod based on a combination of multiple voltages detected by two or more sensors from the plurality of sensors.

5. The electronic controller device of claim 1, further comprising an antenna configured to communicate the generated input signal to a computing device.

6. The electronic controller device of claim 5, wherein the controller circuit is configured to generates the desired counterforce based on instructions associated with an application running on the computing device that utilized the input signal to determine the desired counterforce.

7. The electronic controller device of claim 1, wherein the rotational position of the input rod is determined based on the one or more voltages generated by the plurality of piezoelectric elements and without any contact-based sensors around a base of the input rod.

8. The electronic controller device of claim 1, wherein the plurality of piezoelectric elements includes a plurality of piezoelectric blades configured to flex in response to the force applied to the plurality of piezoelectric elements.

9. The electronic controller device of claim 1, wherein the plurality of piezoelectric elements includes a plurality of piezoelectric rods extending between a top and a base of the body of the input rod.

10. A multi-axis rotational input device, including:
    an input rod including a plurality of piezoelectric elements within a body of the input rod;
    a plurality of sensors electrically coupled to the plurality of piezoelectric elements, wherein a force applied to the body that acts on the plurality of piezoelectric elements is configured to cause one or more voltages to be generated across electrical leads connected to the plurality of sensors; and
    a controller circuit configured to generate an input signal associated with a rotational position of the input rod based on the one or more voltages generated across the electrical leads by the plurality of piezoelectric elements, the controller circuit further configured to apply reply voltages to the plurality of piezoelectric elements to generate a desired counterforce on the input rod.

11. The multi-axis rotational input device of claim 10, wherein the multi-axis rotational input device is one of a thumbstick or a joystick.

12. The multi-axis rotational input device of claim 10, wherein the controller circuit is configured to determine the rotational position of the input rod relative to an equilibrium axis of the input rod based on a combination of multiple voltages detected by two or more sensors from the plurality of sensors.

13. The multi-axis rotational input device of claim 10, wherein the plurality of piezoelectric elements comprises at least three parallel piezoelectric elements.

14. The multi-axis rotational input device of claim 10, wherein the controller circuit is configured to determine the desired counterforce.

15. The multi-axis rotational input device of claim 10, wherein the controller circuit is configured to receive the desired counterforce and to determine the reply voltages from the desired counterforce.

16. A method being performed by a processor on an electronic controller device, the method comprising:
    receiving a plurality of detected voltages by a plurality of sensors electrically connected to a plurality of piezoelectric elements, the plurality of piezoelectric elements being contained within a body of an input rod on the electronic controller device;
    determining, a rotational position of the input rod relative to an equilibrium axis based on the plurality of detected voltages;
    determining a plurality of reply voltages associated with a haptic counterforce response to be applied by the plurality of piezoelectric elements; and
    causing the plurality of reply voltages to be applied to the plurality of piezoelectric elements to create the haptic counterforce response on the body of the input rod.

17. The method of claim 16, further comprising:
    generating an input signal based on the determined rotational position of the input rod,
    transmitting the input signal to a computing device, and
    receiving a command relating to the haptic counterforce response from the computing device.

18. The method of claim 17, wherein determining a plurality of reply voltages is further based on the received command relating to the haptic counterforce response.

19. The method of claim 16, wherein the haptic counterforce response is correlated to an amount of displacement of the input rod at the rotational position.

20. The method of claim 16, wherein the rotational position of the input rod is determined without any contact-based sensors around a base of the input rod.

* * * * *